United States Patent
Bürge et al.

(10) Patent No.: US 9,688,577 B2
(45) Date of Patent: Jun. 27, 2017

(54) CARAMELIZED SUGAR AS LIQUEFIER FOR MINERAL BINDING AGENT COMPOSITIONS

(71) Applicant: SIKA TECHNOLOGY AG, Baar (CH)

(72) Inventors: Christian Bürge, Schafisheim (CH); Christophe Kurz, Endingen (CH); André Peter, Effretikon (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/028,802

(22) PCT Filed: Oct. 20, 2014

(86) PCT No.: PCT/EP2014/072454
§ 371 (c)(1),
(2) Date: Apr. 12, 2016

(87) PCT Pub. No.: WO2015/059100
PCT Pub. Date: Apr. 30, 2015

(65) Prior Publication Data
US 2016/0236981 A1 Aug. 18, 2016

(30) Foreign Application Priority Data
Oct. 25, 2013 (EP) .................................... 13190301

(51) Int. Cl.
C04B 24/10 (2006.01)
C04B 28/02 (2006.01)
C04B 20/02 (2006.01)
C04B 24/18 (2006.01)
C04B 24/28 (2006.01)
C04B 103/30 (2006.01)
C04B 103/40 (2006.01)

(52) U.S. Cl.
CPC ............ C04B 24/10 (2013.01); C04B 20/023 (2013.01); C04B 24/18 (2013.01); C04B 24/283 (2013.01); C04B 28/02 (2013.01); C04B 2103/30 (2013.01); C04B 2103/408 (2013.01)

(58) Field of Classification Search
CPC .................................................... C04B 24/10
See application file for complete search history.

(56) References Cited

U.S. PATENT DOCUMENTS

| | | | | |
|---|---|---|---|---|
| 2,234,191 A | * | 3/1941 | Olze | C04B 24/10 106/657 |
| 2,418,431 A | * | 4/1947 | Scripture, Jr. | C04B 28/04 106/729 |
| 3,573,947 A | * | 4/1971 | Kinkade et al. | C04B 20/02 106/779 |
| 8,092,592 B2 | * | 1/2012 | Buerge | C04B 24/003 106/717 |

FOREIGN PATENT DOCUMENTS

| | | |
|---|---|---|
| CH | 255 349 A | 6/1948 |
| DE | 19 40 843 A1 | 2/1970 |
| DE | 100 15 135 A1 | 10/2001 |
| EP | 1 138 697 A1 | 10/2001 |
| EP | 1 348 729 A1 | 10/2003 |
| EP | 1138697 B1 | 11/2003 |
| EP | 1 061 089 B1 | 3/2004 |
| EP | 2 383 237 A1 | 11/2011 |
| EP | 2559675 A1 | 2/2013 |
| WO | 95/09821 A2 | 4/1995 |
| WO | 97/35814 A1 | 10/1997 |
| WO | 2005/090416 A1 | 9/2005 |

OTHER PUBLICATIONS

"Scientific Opinion on the re-evaluation of caramel colours (E 150 a,b,c,d) as food additives EFSA Panel on Food Additives and Nutrient Sources added to Food (ANS)," EFSA Journal 2011, Chapter 9(3), 2004.
Bolobova et al. "Use of yeast fermentation waste as a biomodifier of concrete (Review)", Applied Biochemistry and Microbiology, vol. 36, No. 3, May 1, 2000, pp. 205-214.
"Compendium of Food Additive Specifications" 2011; ISBN 978-92-5-107004-8; pp. 9-19.

* cited by examiner

Primary Examiner — Paul Marcantoni
(74) Attorney, Agent, or Firm — Oliff PLC

(57) ABSTRACT

The invention relates to the use of caramelized sugar as a liquefier for mineral binding agent compositions.

24 Claims, No Drawings

CARAMELIZED SUGAR AS LIQUEFIER FOR MINERAL BINDING AGENT COMPOSITIONS

TECHNICAL FIELD

The invention relates to the use of plasticizers for mineral binder compositions. The invention further pertains to compositions comprising a plasticizer and also to a method for producing such compositions. The invention further relates to a cured mineral binder composition.

PRIOR ART

Binder compositions, such as mortar mixtures or concrete mixtures, for example, customarily include aggregates as well as a binder, cement for example. Aggregates used are typically particulate rocks in the form of sand and/or gravel. Also known, however, are organic aggregates, examples being plastics such as polystyrene.

Moreover, in order to improve the workability of the binder compositions at as small a water/binder ratio as possible, it is customary to use so-called dispersants as plasticizers. The effects of doing so include not only effective workability on the part of the liquid binder composition but also high mechanical strength after it has cured. Known to be particularly effective dispersants are, for example, polycarboxylate-based comb polymers. Comb polymers of this kind possess a polymer backbone with side chains bonded to it. Corresponding polymers are described in EP 1 138 697 A1 (Sika AG), for example.

The quality of these aggregates has a great influence over the workability of the binder composition and the properties of the cured product. Certain aggregates have a massive influence on water demand and fluidizer demand. Examples are aggregates with high fine fractions, clay-containing minerals, or aggregates obtained from recycled material, especially crushed and washed demolition material. As compared with more high-value aggregates, such as fresh river sand or river gravel, for example, there is a drastic increase in the water and/or fluidizer demand for the same workability, this being an undesirable phenomenon.

While removal of the problematic fines or clays is possible, it entails relatively great effort and is expensive accordingly.

Usually in such cases, therefore, the proportion of fluidizer is raised, but this entails higher costs and may reduce the early compressive strengths, retard setting, and impair the quality of the cured binder composition. With a very high fluidizer content, for example, the result may be excessively harsh or rough concrete.

Another measure sees more water being added to the binder composition. This, however, leads to reduced strengths on the part of the cured binder composition, likewise an undesirable phenomenon.

Another possibility is to use different dispersants, lignosulfonates for example, which are less sensitive in their response to the different qualities of the aggregates. Customarily, the maximum water reduction achievable with such dispersants is very much smaller.

There continues nevertheless to be a demand for improved solutions to the problems identified above.

SUMMARY OF THE INVENTION

An object of the present invention, therefore, is to overcome the problems identified above. More particularly the intention is to find a solution which allows low-quality aggregates to be used in mineral binder compositions with a very low water demand and/or fluidizer demand. And particularly so when recycled aggregates and/or aggregates with high fractions of fines and/or clays are being used. At the same time, the aim is for the workability of the mineral binder compositions to be extremely good and to be able to be maintained over a prolonged period. The solution, furthermore, is to function as far as possible independently of the nature and quality of the aggregates.

Surprisingly it has been found that this can be achieved through the use of caramelized sugar as a plasticizer for mineral binder compositions.

As has emerged, it is possible through the use of caramelized sugar to achieve significant reductions in the water demand and/or fluidizer demand in mineral binder compositions comprising recycled aggregates and/or aggregates with high fractions of fines and/or clays. It is possible, furthermore, to achieve good workability for the mineral binder compositions, which is maintained over a prolonged period.

Further aspects of the present invention are subjects of the independent claims. Particularly advantageous embodiments of the invention are evident from the dependent claims.

WAYS OF PERFORMING THE INVENTION

According to a first aspect, the present invention relates to the use of caramelized sugar as a plasticizer for mineral binder compositions.

The expression "caramelized sugar" presently stands in particular for browning products which are obtainable by heat treatment or heating of sugar.

Specifically this is a dry heat treatment or dry heating. More particularly it means that the heating takes place in the absence of a liquid, more particularly in the absence of water.

The term "sugar" embraces, in particular, monosaccharides, oligosaccharides, or mixtures thereof. Oligosaccharides are understood presently to be saccharides composed of 2-10 identical or different monosaccharides (simple sugars) and are joined to one another by glycosidic bonds. Accordingly, the caramelized sugar comprises, in particular, caramelized monosaccharides and/or caramelized oligosaccharides.

As sugars which serve as starting materials for the production of the caramelized sugars, monosaccharides, oligosaccharides and/or mixtures thereof may be used. They may be present, for example, in the form of glucose syrup, fructose, lactose, dextrose, invert sugars, sucrose, corn syrup, malt syrup, molasses and/or hydrolyzed starch. Other forms of sugar are also possible, however.

The heat treatment of the sugar takes place in particular at atmospheric pressure (1 bar) and in air or in Earth atmosphere.

In the heat treatment, the sugar is heated typically at temperatures of 110-180° C. The sugar in this case is heated more particularly until browning occurs.

In particular the sugar is heated until caramelized sugar having the color intensities and/or color tones defined below is obtained.

The caramelized sugar preferably has a color intensity at a wavelength of 610 nm of 0.005-0.65, more particularly 0.008-0.35, preferably 0.01-0.20 or 0.025-0.09.

More particularly the caramelized sugar has a color intensity at a wavelength of 560 nm of 0.01-0.70, more particularly 0.03-0.45, preferably 0.05-0.30 or 0.06-0.20.

The color intensity here is defined as the absorbance of an aqueous solution containing 1 mg of caramelized sugar (dry matter) per ml of solution (total volume of the solution, including caramelized sugar) at a wavelength of 610 nm and with a light path length of 1 cm. The absorbance (absorptivity) may also be referred to as optical density or extinction and stands for $-\log_{10}(I/I_0)$ or for the negative base-10 logarithm of the ratio of the intensity of the radiation emerging from the sample (I) to the intensity of the radiation entering the sample ($I_0$).

A Hue Index color tone of the caramelized sugar is situated in particular in a range of 3.0-8.0, in particular 3.5-7.5, more particularly 4.0-7.5, preferably 5.0-7.2. This Hue Index is defined as $10 \times \log_{10}(A^{510}/A^{610})$, where $A^{510}$ and $A^{610}$ are the absorbances at 510 nm and 610 nm respectively.

The caramelized sugar more particularly comprises or consists of caramel. "Caramel" presently is a browning product obtained exclusively by heating sugar, e.g., sucrose. In the production of caramel, in particular, no reaction accelerators or no further substances are used.

According to another advantageous embodiment, the caramelized sugar comprises or consists of caramel color.

Caramel color is, more particularly, a substance conforming to Einecs Index No. 232-435-9 and/or CAS Registry number 8028-89-5.

Caramel color may be produced in a similar way as for caramel, but usually with the further addition of reaction accelerators during the heat treatment or during caramelizing. These accelerators are bases or acids, for example.

Use is made more particularly as reaction accelerators of one or more substances from the group of sodium hydroxide solution, sodium sulfide, potassium sulfite, sulfurous acids, sulfite compounds, and ammonium compounds. Caramel colors differing in composition are formed according to the particular reaction accelerator used in their production.

The caramel color is more particularly a caramel color of type INS No. 150, preferably 150a, 150b, 150c and/or 150d. The type here is defined in line with the internationally recognized Codex Alimentarius of the Joint FAO/WHO Expert Committee on Food Additives, (see, for example, Compendium Of Food Additive Specifications; Joint FAO/WHO Expert Committee on Food Additives, $74^{th}$ Meeting 2011; ISBN 978-92-5-107004-8; pages 9-20). Within the European sphere, the INS number is customarily prefixed with the letter "E". In this case, for example, INS No. 150a corresponds to E150a.

For the preparation of caramel color of type INS No. 150a, also called plain caramel color, sodium hydroxide solution or strong acids are used as reaction accelerators. In the case of caramel color of type INS No. 150b, also referred to as caustic sulfite caramel color, reaction accelerators used are sulfite compounds, as for example sodium sulfite, potassium sulfite, or sulfurous acids. In the case of caramel color of type INS No. 150c, also called ammonia caramel color, ammonium compounds are employed as reaction accelerators. Caramel color of type INS No. 150d, also called ammonium sulfite caramel color, is prepared by means of sulfite compounds and ammonium compounds.

Advantageous in the present context is caramel color of type INS No. 150a and/or 150d. Especially preferred is the type INS No. 150a.

The term "plasticizer" refers in the present context in particular to a substance which if added to a mineral binder composition has the capacity to improve the fluidity or workability of the mineral binder composition mixed up with water. This improvement is by comparison with a mineral binder composition which while not containing plasticizer nevertheless otherwise has the same composition. The fluidity or workability is assessed in particular through the extent of spread in accordance with standard EN 1015-3.

Accordingly, the caramelized sugar is used in particular for improving the fluidity and/or workability of the mineral binder composition.

As has been found, the caramelized sugar can also be used to extend the working time of mineral binder compositions. By this is meant more particularly that the extent of spread of a first mineral binder composition treated with the caramelized sugar decreases to less of an extent over time than the extent of spread of a second mineral binder composition which while containing no caramelized sugar nevertheless otherwise has a composition identical with that of the first mineral binder composition.

The caramelized sugar can therefore be used to extend the working time of the mineral binder composition.

The expression "mineral binder" means in particular a binder which reacts in a hydration reaction in the presence of water to form solid hydrates or hydrate phases. It may be, for example, a hydraulic binder (e.g., cement or hydraulic lime), a latent hydraulic binder (e.g., slag), a pozzolanic binder (e.g., flyash), or a nonhydraulic binder (gypsum or air lime). A "cementious binder" refers in the present context in particular to a binder or binder composition having a cement clinker fraction of at least 5 wt %, more particularly of at least 20 wt %, preferably at least 35 wt %, in particular at least 65 wt %. The cement clinker is preferably a Portland cement clinker. Cement clinker in the present context refers in particular to ground cement clinker.

A "mineral binder composition" refers, accordingly, to a composition comprising a mineral binder and, where appropriate, further components, such as aggregates, water and/or admixtures, for example. Admixtures in the present context are, in particular, concrete admixtures and/or admixtures according to standard EN 934-2.

The mineral binder or mineral binder composition in particular comprises a hydraulic binder, preferably cement. Particularly preferred is a cement with a cement clinker fraction of ≥35 wt %. More particularly the cement is of type CEM I, CEM II and/or CEM III (according to standard EN 197-1). The fraction of the hydraulic binder within the mineral binder as a whole is advantageously at least 5 wt %, more particularly at least 20 wt %, preferably at least 35 wt %, in particular at least 65 wt %. According to a further advantageous embodiment, the mineral binder is composed to an extent of ≥95 wt % of hydraulic binder, more particularly of cement clinker.

It may, however, also be advantageous for the binder or binder composition to comprise or consist of other binders. These are, in particular, latent hydraulic binders and/or pozzolanic binders. Suitable latent hydraulic and/or pozzolanic binders are, for example, slag, flyash and/or silica dust. The binder composition may also include inert substances such as, for example, limestone, finely ground quartzes and/or pigments. In one advantageous embodiment, the mineral binder comprises 5-95 wt %, more particularly 5-65 wt %, very preferably 15-35 wt % of latent hydraulic and/or pozzolanic binders. Advantageous latent hydraulic and/or pozzolanic binders are slag and/or flyash.

In a particularly preferred embodiment the mineral binder comprises a hydraulic binder, more particularly cement clinker, and a latent hydraulic and/or pozzolanic binder, preferably slag and/or flyash. The proportion of the latent hydraulic and/or pozzolanic binder in this case is very preferably 5-65 wt %, very preferably 15-35 wt %, while there is at least 35 wt %, in particular at least 65 wt %, of the hydraulic binder present.

A mineral binder fraction amounts in particular to 1-100 wt %, more particularly 5-50 wt %, especially 10-30 wt %, based on the total weight of the mineral binder composition.

In a further preferred embodiment the binder composition additionally comprises solid aggregates, more particularly gravel, sand and/or particulate rock. Corresponding binder mixtures may be used, for example, as mortar mixtures or concrete mixtures.

The aggregates preferably have a proportion of 5-95 wt %, more particularly 50-90 wt %, especially 60-85 wt %, based on the total weight of the mineral binder composition.

The aggregates exhibit in particular a water absorption as per DIN EN standard 1097-6:2000+AC:2002+A1:2005 of 0-5 wt %, more particularly 0.1-4 wt %, especially 0.2-4 wt %, in particular 0.4-3.5 wt % or 0.5-3 wt % (water absorption based on the dry mass of the aggregates).

The fine fractions content of the aggregates is, in particular, 0.001-40 wt %, more particularly 1-35, especially 1.5-30 wt % or 3-30 wt %, based on the total weight of all the aggregates. Fine fractions presently denote solids having a particle size ≤125 µm. The particle size may be determined, for example, by sieve analysis using a sieve having square openings (125×125 µm openings). The fine fractions are, in particular, inert solids and/or solids which are not mineral binders.

The clay content of the aggregates is situated in particular in the range of 0-5 wt %, more particularly 0.1-4 wt %, especially 0.3-3.5 wt %, in particular 0.5-3.5 wt % or 1-3 wt %. "Clay" in the present context means, in particular, phyllosilicates. The clay content of the aggregates is determined more particularly by the Rietveld method, which is based on X-ray diffraction (XRD). This method is known per se to the person skilled in the art.

The methylene blue value for the aggregates in accordance with standard DIN EN 933-9 is situated in particular in the range of 0.1-100 g/kg (particle class 0-75 µm), especially 3-85 g/kg (particle size class 0-75 µm), in particular 15-75 g/kg (particle size class 0-75 µm) or 25-60 g/kg (particle size class 0-75 µm).

The methylene blue value can be considered a measure of the quality of the aggregates or of the surface activity of the aggregates. The higher, for example, the clay content and/or the level of absorbing fines in the aggregates, the greater the methylene blue value and the lower the quality of the aggregates.

In particular the binder composition additionally comprises water, in which case the weight ratio of water to mineral binder is preferably in the range of 0.25-0.9, more particularly 0.3-0.8, preferably 0.35-0.7. Binder mixtures of this kind can be processed directly as mortar mixtures or concrete mixtures.

The caramelized sugar is used with advantage in an amount of 0.0005-10 wt %, more particularly 0.001-2 wt %, preferably 0.004-0.5 wt %, based in each case on the dry matter content of the caramelized sugar and based on the mineral binder content of the mineral binder composition.

The caramelized sugar is used with advantage in the form of an aqueous solution having a caramelized sugar dry matter content of 0.01-90 wt %, more particularly 10-80 wt %, preferably 25-75 wt % or 35-70 wt %. Its effect in particular is to enable good metering.

According to one advantageous embodiment, the caramelized sugar is employed together with at least one admixture, more particularly with a plasticizer, accelerator, retardant, air entrainer, defoamer, shrinkage reducer, corrosion inhibitor, preservative, stabilizer and/or dye.

In particular, the caramelized sugar is used together with at least one further plasticizer. The at least one further plasticizer here differs chemically from the caramelized sugar. The at least one further plasticizer advantageously comprises lignosulfonatenes, sulfonated naphthalene-formaldehyde condensates, sulfonated melamine-formaldehyde condensates, vinyl copolymers, polycarboxylates and/or polycarboxylate ethers (PCE) or it consists of these.

The at least one further plasticizer is used in particular with a fraction of 0.001-10 wt %, more particularly 0.01-5 wt %, preferably 0.02-3 wt %, based on the weight of the mineral binder. These weight figures are, in particular, based on the dry matter content of the plasticizer.

The weight ratio of caramelized sugar to the at least one further plasticizer is situated more particularly in a range of 1:50-50:1, preferably 1:10-10:1, in particular 1:10-5:1 or 1:8-2:1.

With particular preference the at least one further plasticizer comprises or consists of a polycarboxylate ether. The polycarboxylate ether has side chains attached in particular via ester, ether, amide and/or imide groups to a main chain. Ester, ether and/or amide groups are preferred, especially esters and/or ether groups. The main chain has at least one acid unit or a salt thereof. The acid unit in particular is an α-unsaturated monocarboxylic or dicarboxylic acid, such as acrylic acid, methacrylic acid, maleic anhydride, maleic acid, itaconic acid, crotonic acid, or fumaric acid. The acid unit is preferably acrylic acid, methacrylic acid, maleic acid and/or a salt thereof and/or combinations thereof.

More particularly the side chains comprise polyalkylene oxide side chains, preferably polyethylene oxide units. Preferably at least 50 mol %, more particularly at least 75 mol %, preferably at least 95 mol % or 100 mol % of the side chains contain or consist of polyalkylene oxide.

The fraction of ethylene oxide units in the polyalkylene oxide side chains, based on all the alkylene oxide units present in the side chains, is preferably more than 90 mol %, more particularly more than 95 mol %, preferably more than 98 mol %, especially 100 mol %.

The polyalkylene oxide side chains preferably have no hydrophobic groups, more particularly no alkylene oxides having three or more carbon atoms. A high proportion of ethylene oxide units or a low level of alkylene oxides having three or more carbon atoms reduces the risk of unwanted introduction of air.

The polyalkylene oxide side chains have in particular a structure of formula -$[AO]_n$—$R^a$. In this formula, in particular, A is $C_2$ to $C_5$ alkylene, which may be branched or unbranched. $R^a$ is preferably H or a $C_1$ to $C_{20}$ alkyl group, cyclohexyl group, or alkylaryl group. With advantage, n is 2 to 300, more particularly 3 to 200 or 5 to 150.

A weight-average molecular weight ($M_w$) of the polycarboxylate ether is especially 5000-150 000 g/mol, preferably 10 000-100 000 g/mol. A number-average molecular weight ($M_n$) of the polycarboxylate ether is advantageously 3000-100 000 g/mol, more particularly 8000-70 000 g/mol. The weight-average molecular weight is determined by gel permeation chromatography (GPC) using polyethylene glycol (PEG) as standard. This technique is known per se to the person skilled in the art.

The polycarboxylate ether preferably comprises or consists of the following structural subunits:

a) a mole fractions of a structural subunit S1 of the formula (I)

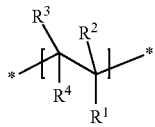

b) b mole fractions of a structural subunit S2 of the formula (II)

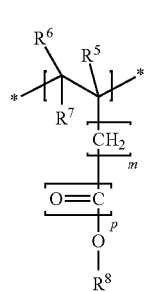

c) optionally c mole fractions of a structural subunit S3 of the formula (III)

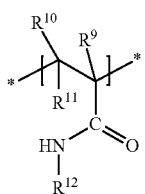

d) optionally d mole fractions of a structural subunit S4 of the formula (IV)

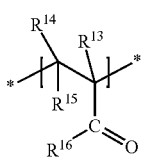

where
- $R^1$, in each case independently of any other, is —COOM, —SO$_2$—OM, —O—PO(OM)$_2$ and/or —PO(OM)$_2$,
- $R^2$, $R^3$, $R^5$, $R^6$, $R^9$, $R^{10}$, $R^{13}$ and $R^{14}$, in each case independently of one another, are H or an alkyl group having 1 to 5 carbon atoms,
- $R^4$, $R^7$, $R^{11}$ and $R^{15}$, in each case independently of one another, are H, —COOM or an alkyl group having 1 to 5 carbon atoms,
- M, independently of any other, is H$^+$, an alkali metal ion, an alkaline earth metal ion, a di- or trivalent metal ion, an ammonium ion or an organic ammonium group,
- m is 0, 1 or 2,
- p is 0 or 1,
- $R^8$ and $R^{12}$, in each case independently of one another, are a C$_1$ to C$_{20}$ alkyl, cycloalkyl or alkylaryl group or are a group of the formula -[AO]$_n$—R$^a$,
  where A is C$_2$ to C$_4$ alkylene, R$^a$ is H, a C$_1$ to C$_{20}$ alkyl, cyclohexyl or alkylaryl group,
  and n is 2 to 300, in particular 3 to 200 or 5 to 150,
- $R^{16}$, independently of any other, is NH$_2$, —NR$^b$R$^c$ or —OR$^d$NR$^e$R$^f$,
  where R$^b$ and R$^c$, independently of one another, are
  a C$_1$ to C$_{20}$ alkyl, cycloalkyl, alkylaryl or aryl group, or are a hydroxyalkyl group or are an acetoxyethyl (CH$_3$—CO—O—CH$_2$—CH$_2$—) or a hydroxyisopropyl (HO—CH(CH$_3$)—CH$_2$—) or an acetoxyisopropyl (CH$_3$—CO—O—CH(CH$_3$)—CH$_2$—) group;
  or R$^b$ and R$^c$ together form a ring of which the nitrogen is a part, in order to construct a morpholine or imidazoline ring;
  R$^d$ is a C$_2$-C$_4$ alkylene group,
  R$^e$ and R$^f$ each independently of one another are a C$_1$ to C$_{20}$ alkyl, cycloalkyl, alkylaryl or aryl group or a hydroxyalkyl group, and where a, b, c and d are mole fractions of the respective structural subunits S1, S2, S3, and S4, where a/b/c/d=(0.05-0.95)/(0.05-0.8)/(0-0.3)/(0-0.3), more particularly a/b/c/d=(0.3-0.9)/(0.1-0.6)/(0-0.15)/(0-0.15), preferably a/b/c/d=(0.5-0.8)/(0.2-0.5)/(0-0.1)/0, and with the proviso that a+b+c+d is 1.

The sequence of the structural subunits S1, S2, S3, and S4 may be alternating, blocklike or random. It is also possible, moreover, for there to be further structural subunits in addition to the structural subunits S1, S2, S3, and S4.

The structural subunits S1, S2, S3, and S4 together preferably have a weight fraction of at least 50 wt %, more particularly at least 90 wt %, very preferably at least 95 wt %, of the total weight of the polycarboxylate ether.

A ratio of a/(b+c+d)=is in particular in the range of 1-5 In the polycarboxylate ether, in particular, $R^1$ is COOM, $R^2$ is H or CH$_3$, and $R^3$=$R^4$=H. The polycarboxylate ether can therefore be prepared on the basis of acrylic or methacrylic acid monomers, this being of advantage from an economic standpoint.

Likewise advantageous are polycarboxylate ethers where $R^1$=COOM, $R^2$=H, $R^3$=H, and $R^4$=COOM. Such polycarboxylate ethers can be prepared on the basis of maleic acid monomers.

Advantageously, $R^5$ is H or CH$_3$ and $R^6$=$R^7$=H. Polycarboxylate ethers of these kinds can be prepared, for example, starting from (meth)acrylic esters, vinyl ethers, (meth)allyl ethers or isoprenol ethers.

If S3 is present, then in particular $R^9$ is H or CH$_3$ and $R^{10}$=$R^{11}$=H.

If S4 is present, then in particular $R^{13}$ is H or CH$_3$ and $R^{14}$=$R^{15}$=H.

Very advantageously, $R^2$ and $R^5$ are mixtures of H and —CH$_3$. Preferred in that case are mixtures with 40-60 mol % H and 40-60 mol % —CH$_3$. If the corresponding structural subunits are present, this is also true, in particular, for $R^9$ and $R^{13}$. With preference, moreover, $R^3$ and $R^6$ are H, and also, if the corresponding structural subunits are present, $R^9$ and $R^{13}$ are H.

According to further advantageous embodiment, $R^1$ is COOM, $R^2$=H, $R^5$=—CH$_3$, and $R^3$=$R^4$=$R^6$=$R^7$=H.

In the case of another advantageous embodiment, $R^1$ is COOM, $R^2$=$R^5$=H or —CH$_3$, and $R^3$=$R^4$=$R^6$=$R^7$=H.

In particular, $R^8$ and/or $R^{12}$ are -[AO]$_n$—$R^a$, and preferably A is $C_2$ alkylene and/or $R^a$ is H or a $C_1$ alkyl group. Advantageously, n is 2-300, more particularly n is 3-200, preferably n is 5-150.

In particular, m is 0 and p is 1. Likewise advantageously, m is 1 or 2 and p is 0, and, in particular, $R^5$ is —$CH_3$.

For particularly preferred polycarboxylate ethers:
a) $R^1$ is COOM;
b) $R^2$ and $R^5$, independently of one another, are H, —$CH_3$ or mixtures thereof. Very advantageously, $R^2$ and $R^5$ are mixtures of H and —$CH_3$. Preference in that case is given to mixtures with 40-60 mol % H and 40-60 mol % —$CH_3$. If structural subunits S3 and/or S4 are present, this is also true, in particular, for $R^9$ and $R^{13}$;
c) $R^3$ and $R^6$ are H. If structural subunits S3 and/or S4 are present, this is also true, in particular, for $R^{10}$ and/or $R^{14}$;
d) $R^4$ and $R^7$, independently of one another, are H or —COOM, preferably H. If structural subunits S3 and/or S4 are present, this is also true, in particular, for $R^{11}$ and $R^{15}$;
e) $R^8$ is -[AO]$_n$—$R^a$, and preferably A is $C_2$ alkylene and/or $R^a$ is H or a $C_1$ alkyl group. Advantageously n is 2-300, more particularly n is 3-200, preferably n is 5-150. If structural subunit S3 is present, this is also true, in particular, for $R^{12}$;
f) m is 0 and p is 1.

The polycarboxylate ethers of the invention can be prepared in a way which is known per se. Use is made here in particular of the polymer-analogous reaction or the radical polymerization.

The polycarboxylate ethers may be prepared by the polymer-analogous reaction. In this reaction first of all a main chain is prepared, and is then furnished with side chains. Polymer-analogous reactions are known per se and are described for example in WO97/35814A1, WO95/09821A2, DE 100 15 135A1, EP 1138697A1, EP1348729A1, and WO2005/090416A1. Details relating to the polymer-analogous reaction are for example disclosed in EP 1 138 697 B1 at page 7 line 20 to page 8 line 50, and also in the examples contained therein, or in EP 1 061 089 B1 at page 4 line 54 to page 5 line 38 and also in the examples.

The polycarboxylate ethers may also be prepared by a radical polymerization reaction in which the copolymer is obtained from corresponding ethylenically unsaturated acid, ester, and amide monomers in the presence of a radical initiator. This technique is known per se to the person skilled in the art.

In an additional aspect the invention relates to a composition comprising caramelized sugar and also at least one member from the group consisting of mineral binders, aggregates, and admixtures for mortar and/or concrete.

Admixtures for mortar and/or concrete here are, in particular, substances as defined according to EN 934-2. More particularly they are accelerators, retardants, air entrainers, defoamers, shrinkage reducers, corrosion inhibitors, preservatives, stabilizers and/or dyes.

The composition in this case may be present in the solid or liquid state or in pastelike state.

The composition preferably comprises caramelized sugar and at least one further plasticizer as described above. The at least one further plasticizer more particularly comprises a polycarboxylate ether.

With advantage the weight ratio of caramelized sugar to the at least one further plasticizer is situated in a range of 1:50-50:1, preferably 1:10-10:1, in particular 1:10-5:1 or 1:8-2:1.

According to one specific embodiment, the composition comprises or consists of the following components:
a) 2-50 wt %, more particularly 10-40 wt %, preferably 15-35 wt % of a further plasticizer,
b) 0.2-50 wt %, more particularly 0.5-30 wt %, preferably 1-15 wt % of the caramelized sugar,
c) 10-97.5 wt %, more particularly 50-95 wt %, preferably 75-90 wt % of water,
d) 0-50 wt %, more particularly 0-10 wt % or 0.001-5 wt % of further admixtures, such as, for example, accelerators, retardants, air entrainers, defoamers, shrinkage reducers, corrosion inhibitors, preservatives, stabilizers and/or dyes.

These weight figures are based in each case on the dry matter content or the actual active substance content of the respective components and also on the total weight of the composition.

The invention further pertains to a mineral binder composition comprising at least one mineral binder and caramelized sugar. The mineral binder composition may optionally further comprise aggregates and/or admixtures as described above. More particularly the mineral binder composition comprises a further plasticizer as described above, preferably a polycarboxylate ether.

The invention relates, moreover, to a cured binder composition which is obtainable by mixing of a mineral binder composition as described above with water and subsequent curing.

A further aspect of the present invention relates to a method for producing a composition, comprising a step of adding caramelized sugar to a mineral binder, aggregates, and/or to an admixture for concrete and/or mortar.

In particular this is a method for producing a mineral binder composition comprising at least one mineral binder where caramelized sugar is added to at least one component of the binder composition before, during and/or after the mixing of the binder composition.

The caramelized sugar may for example be admixed to the mixing water. Also possible, however, is the mixing of at least part of the caramelized sugar even prior to mixing with the mineral binder, any aggregates and/or an admixture.

In particular, before the mixing of the mineral binder composition, at least one component of the mineral binder composition, more particularly the mineral binder and/or aggregates, is coated with the caramelized sugar. Preferably it is the aggregates that are coated.

The present invention is elucidated below by means of working examples. Arising from the working examples and from the entirety of the claims are further advantageous embodiments of the present invention.

WORKING EXAMPLES

1. Substances and Materials

Substances as follows were used for the working examples (table 1):

TABLE 1

| Designation | Substance | Source |
|---|---|---|
| PCE | Sika ViscoCrete ® 2100 (polycarboxylate ether with structural subunits S1, S2, and S3, as described above; | Sika USA |

TABLE 1-continued

| Designation | Substance | Source |
|---|---|---|
| | solids content: 40 wt %) | |
| ZK1 | Caramel Colour 1085 (caramel color of type INS No. 150a); dry matter content: 60 wt % | Sugro AG, Switzerland |
| ZK2 | Caramel RE504 (caramel color of type 150d); dry matter content: 40 wt % | Hostettler Spezialzucker AG, Zürich, Switzerland |
| ZK3 | Caramel RE506 (caramel); dry matter content: 40 wt % | Hostettler Spezialzucker AG, Zürich, Switzerland |
| Sac | Sucrose; 40 wt % in $H_2O$ | Zuckerfabrik Frauenfeld, Switzerland |
| Glu | D (+) Glucose monohydrate; 40 wt % in $H_2O$ | Merck Schweiz AG |
| Lig | Sodium lignosulfonate N9; 45 wt % in $H_2O$ | Tembec Avebene SAS, France |
| Sand | Sand, washed, dried with particle sizes | Kieswerk Hauser AG, Switzerland |
| 0-1 mm | 0-1 mm | |
| 1-4 mm | particle size 1-4 mm | |
| 4-8 mm | particle size 4-8 mm | |
| Gravel | Rounded gravel, dried, with | Kieswerk Hauser AG, Switzerland |
| 8-16 mm | particle size 8-16 mm | |
| 16-32 mm | particle size 8-32 mm | |
| AdR | Arena de Rio sand Sand with high clay fraction and a particle size of 0-8 mm | Ingeniería Extractiva Manuel Rodríguez y CIA, S.A. de C.V, Dolores Hidalgo, Estado de Guanajuato, Mexico |
| SanV | San Vincente sand Sand with high fines fraction and a particle size of 0-8 mm | CEMEX Agregados, San Vicente Chicoloapan, Estado de México, Mexico |
| RCM | Recycled sand with a particle size of 0-4 mm | Richi AG, Weiningen, Switzerland |
| Filler | Nekafill (limestone filler) | Netstal AG, Switzerland |

2. Production of Admixture Compositions

Two admixture compositions were produced as described in table 2.

TABLE 2

| Component | ZM1 [wt %] | ZM2 [wt %] |
|---|---|---|
| Water | 25 | 17 |
| PCE | 75 | 75 |
| ZK1 | — | 8 |

3. Mortar Mixtures

The mortar mixtures MM1-MM3 used have the dry compositions described in table 3.

TABLE 3

| Component | MM1 | MM2 | MM3 |
|---|---|---|---|
| Cement | | 750 g | |
| Filler | 111 g | | 35 g |
| Sand 0-1 mm | 584 g | | 184 g |
| Sand 1-4 mm | 876 g | | 277 g |
| Sand 4-8 mm | — | | 288 g |
| AdR sand (0-8 mm) | 1571 g | — | — |
| SanV sand (0-8 mm) | — | 1571 g | — |
| RCM sand (0-4 mm) | — | — | 2355 g |

Cement used was Schweizer CEM I 42.5 N (a mixture of cements composed of Normo 4 [Holcim AG/Siggenthal], Vigier CEM I 42.5N [Vigier Ciment AG], and CEM I 42.5 N [Jura cement/Wildegg] in a weight ratio of 1:1:1).

The amount of fine fractions (particle size ≤125 μm), the methylene blue value, and the water absorption of the components of the mortar mixtures MM1-MM3 are shown in table 4.

TABLE 4

| Components | Fine fractions (≤125 μm) [wt %] | Methylene blue value [g/kg] (particle size class 0-75 μm) | Clay contents [wt %] | Water absorption [wt %] |
|---|---|---|---|---|
| Filler + Sand 0-1 mm + Sand 1-4 mm | 9 | 1 | <0.1 | 0.46 |
| Sand 4-8 mm | <0.1 | <0.1 | <0.1 | n.d. |
| AdR sand | 2 | 47.5 | 2 | 2.75 |
| SanV sand | 24 | 9 | <0.1 | 1.26 |
| RCM sand | n.d. | n.d. | n.d. | n.d. | n.d. = not determined

The amount of fine fractions was determined by sieve analysis using a sieve having square openings (125×125 μm openings). The methylene blue value was determined according to standard DIN EN 933-9 and the water absorption according to standard EN 1097-6. The clay content was determined by X-ray diffraction and the Rietveld method.

The mortar mixtures were prepared by dry-mixing the sands, the filler, and the cement in a Hobart mixer for 1 minute. Over the course of 30 seconds the mixing water, optionally admixed previously with caramel color and/or further admixtures, was added, and mixing took place for a further 2.5 minutes. The total wet mixing time was 3 minutes in each case.

4. Concrete Mixtures

Likewise produced was a concrete mixture BM1 having the dry compositions described in table 5.

TABLE 5

| Component | BM1 [wt %] |
|---|---|
| Cement | 16 |
| Filler | 5 |
| Sand 0-1 mm | 14 |
| Sand 1-4 mm | 21 |
| Sand 4-8 mm | 15 |
| Gravel 8-16 mm | 15 |
| Gravel 16-32 mm | 30 |

Cement used for the concrete mixture BM1 was Optimo 4, a Portland composite cement of type CEM II/B-M (T-LL) 42.5 N [Holcim AG/Siggenthal]. For the mixing of the concrete mixture, the procedure was as described for the mortar mixtures MM1-MM3.

5. Test Methods

For the purposes of determining the activity of the caramel colors, the hydration behavior of the mortar and concrete mixtures prepared and mixed up as above were monitored by measurement of the chronological temperature profile. The temperature measurement was made under adiabatic conditions with a thermocouple as temperature sensor in a way which is known per se. All of the samples were measured under identical conditions. The measure considered for the solidification time in the present case is the time elapsing from the mixing of the mortar mixture to the attainment of the maximum temperature occurring after the induction phase or rest phase.

The fluidity or workability of the mortar compositions was determined on the basis of the extent of spread or the slump. This determination is made immediately after mixing (=time zero) and also after 30, 60, and 90 minutes. The extent of spread (EOS) was measured according to standard EN 1015-3 for mortar compositions and EN 12350-5 for concrete compositions. The slump was determined in analogy to standard EN 12350-2.

In the case of the concrete mixtures, moreover, determinations were made of the compressive strengths at different times after mixing. The test for determining the compressive strength (in $N/mm^2$) was in accordance with standard EN 12390-1 to 12390-4.

6. Results

Table 6 summarizes the results using various additives in mortar mixture MM1 at a water/cement ratio of 0.72. The "$\Delta_{0-60}$" column reports the percentage decrease in the slump or in the workability over the period of 60 minutes after mixing.

TABLE 6

| No. | Additive | Metering [wt %] | Slump [mm] after | | | $\Delta_{0-60}$ |
| | | | 0 min | 30 min | 60 min | |
| --- | --- | --- | --- | --- | --- | --- |
| A1 | PCE | 0.8 | 58 | 28 | 12 | −79% |
| A2 | PCE | 0.5 | 18 | 9 | 4 | −78% |
| A3 | PCE | 0.5 | 25 | 9 | 4 | −84% |
| | Sac | 0.5 | | | | |
| A4 | PCE | 0.5 | 28 | 3 | n.m. | −100% |
| | Glu | 0.5 | | | | |
| A5 | PCE | 0.5 | 52 | 26 | 8 | −84% |
| | ZK3 | 0.5 | | | | |
| A6 | — | — | 23 | 17 | 10 | −56% |
| A7 | Sac | 0.5 | 40 | 26 | 23 | −43% |
| A8 | Glu | 0.5 | 25 | 18 | 9 | −64% |
| A9 | ZK3 | 0.5 | 27 | 19 | 16 | −41% |
| A10 | PCE | 0.5 | 53 | 27 | 11 | −79% |
| | ZK3 | 1.0 | | | | | n.m. = not measurable, since too stiff

As can be seen from a comparison of experiments A2 and A5, adding caramel color allows the workability to improve significantly, even at relatively low levels of addition of PCE, and to be maintained more effectively over a longer time. Without caramel color, such properties are achievable only at high levels of addition of PCE (cf. experiment A1), which, however, is less economical and has adverse consequences for mortar quality. The assumption is that the improvement in the workability is caused in particular through reduced adsorption of the PCEs on the aggregates. If the concentration of caramel color is increased further relative to experiment A5 (experiment A10), there is no further marked improvement in the workability. This may be due to the already maximum reduction of PCE adsorption on the aggregates in the case of the lower level of addition of caramel color (experiment A5). A further increase in the level of caramel color addition therefore does not lead to a further marked increase in workability, since caramel color alone exhibits a lower—relatively—plasticizing effect on the mortar mixture (cf. experiment A6 and experiment A9)

As can be seen from experiment A7, sucrose on its own produces a relatively sharp increase in the workability. This is presumably also the reason for the improved workability in experiment A3. In comparison to sucrose and caramel color, glucose has a lower initial slump (experiment A8). Glucose does not show a marked plasticizing effect either on its own or in combination with a PCE. The latter fact may be attributable to the fact that glucose does not produce a substantial reduction in the adsorption of PCE on the aggregates. In the case of experiments with sucrose and glucose (experiments A3, A4, A7, and A8), moreover, in comparison with the experiments containing caramel color (experiments A5, A9, and A10), the solidification time is extended greatly, particularly in the case of the experiments with sucrose.

Table 7 shows the results using different additives in mortar mixture MM2 for a water/cement ratio of 0.68. The column "$\Delta_{0-60}$" is defined as described for table 6.

TABLE 7

| No. | Additive | Level of addition [wt %] | Slump [mm] after | | | $\Delta_{0-60}$ | Solidification time [h] |
| | | | 0 min | 30 min | 60 min | | |
| --- | --- | --- | --- | --- | --- | --- | --- |
| B1 | PCE | 0.26 | 53 | 20 | 13 | −75% | 12.3 |
| B2 | PCE | 0.16 | 38 | 25 | 21 | −45% | 11.2 |
| B3 | PCE | 0.16 | 51 | 28 | 18 | −65% | 31.7 |
| | Sac | 0.5 | | | | | |
| B4 | PCE | 0.16 | 21 | 5 | 3 | −86% | 14.8 |
| | Glu | 0.5 | | | | | |
| B5 | PCE | 0.16 | 65 | 35 | 31 | −52% | 12.2 |
| | ZK2 | 0.5 | | | | | |
| B6 | — | — | 17 | 10 | 4 | −77% | — |
| B7 | Sac | 0.5 | 32 | 25 | 17 | −47% | — |
| B8 | Glu | 0.5 | 16 | 11 | 4 | −75% | — |
| B9 | ZK2 | 0.5 | 27 | 17 | 9 | −67% | — |
| B10 | PCE | 0.16 | 62 | 35 | 28 | −55% | — |
| | ZK2 | 1.0 | | | | | |
| B11 | Lig | 0.5 | 50 | 37 | 30 | −40% | — |
| B12 | Lig | 0.5 | 69 | 48 | 40 | −42% | — |
| | Sac | 0.5 | | | | | |
| B13 | Lig | 0.5 | 53 | 31 | 25 | −34% | — |
| | Glu | 0.5 | | | | | |
| B14 | Lig | 0.5 | 59 | 36 | 26 | −56% | — |
| | ZK2 | 0.5 | | | | | |

A high level of addition of PCE does permit produce some kind of good workability after 0 minutes, but the workability decreases sharply after only 30 minutes (experiment B1).

A comparison of experiments B2 with B5 shows in turn that by addition of caramel color, it is possible to improve the workability significantly, even at relatively low levels of addition of PCE, and to maintain it more effectively over a longer time. This is achieved, moreover, without a significant extension to the solidification time, as is the case in particular when using sucrose (experiment B3). Glucose (experiment B4), in contrast, does not exhibit improved workability, but likewise prolongs the setting time.

It is also noteworthy that sucrose on its own (experiment B7) already produces a relatively sharp increase in the plasticization. The increased plasticizing effect in the case of experiment B3, accordingly, is probably caused substantially by the plasticizing performance of the sucrose. In contrast to this, the plasticizing performance of the caramel color is not sufficient to explain the massively higher plasticizing effects in the case of experiment B5. This can be explained in particular by the lowering of the adsorption of the PCE on the aggregates.

Since the adsorption of lignosulfonate on the aggregates is less, the experiments with additional sucrose or caramel color (experiments B12 and B14) do not show any marked additional effects apart from the inherent plasticization. A comparison of experiments B1 and B11 shows, furthermore, that lignosulfonates have to be added at massively higher levels than PCEs, in order to achieve a comparable initial workability.

Table 8 shows the results using different additives in mortar mixture MM3 at a water/cement ratio of 0.86. The "$\Delta_{0\text{-}90}$" column reports the percentage decrease in the extent of spread or workability over a period of 90 minutes after mixing.

TABLE 8

| No. | Additive | Level of addition [wt %] | Extent of spread [mm] after | | | | $\Delta_{0\text{-}90}$ | Solidification time [h] |
|---|---|---|---|---|---|---|---|---|
| | | | 0 min | 30 min | 60 min | 90 min | | |
| C1 | PCE | 1.0 | 200 | 153 | 132 | 126 | −37% | 15.7 |
| C2 | PCE Sac | 1.0 0.5 | 197 | 174 | 168 | 157 | −20% | 19.8 |
| C3 | PCE Glu | 1.0 0.5 | 185 | 147 | 125 | 100 | −46% | 17.2 |
| C4 | PCE ZK1 | 1.0 0.33 | 195 | 171 | 158 | 142 | −27% | 15.2 |

A comparison of experiments C1 and C4 shows that with caramel color it is possible to maintain the workability more effectively over time and that a significantly better plasticizing effect is achievable of 30, 60, and 90 minutes after mixing. This is possible without any increase in the solidification time, as is the case with sucrose (experiment C2), for example.

Table 9 shows the results using the admixture compositions ZM1 and ZM2 in the concrete mixture BM1 at a water/cement ratio of 0.45. The "$\Delta_{0\text{-}90}$" column reports the percentage decrease in the extent of slump or the workability in the period of 90 minutes after mixing.

TABLE 9

| No. | Additive | Level of addition [wt %] | Extent of spread [cm] after | | | | $\Delta_{0\text{-}90}$ | Compressive strength [MPa] after | |
|---|---|---|---|---|---|---|---|---|---|
| | | | 0 min | 30 min | 60 min | 90 min | | 1 day | 7 days |
| D1 | ZM1 | 0.8 | 61 | 52 | 48 | 44 | −28% | 29.2 | 46.9 |
| D2 | ZM2 | 0.8 | 65 | 59 | 55 | 49 | −25% | 29.2 | 47.4 |

A comparison of the two experiments D1 and D2 shows that caramelized sugar even in conventional mineral concrete compositions shows a plasticizing effect and is capable of maintaining the workability more effectively over time.

Table 10 shows the results using different additives in mortar mixture MM2 at a water/cement ratio of 0.73. The "$\Delta_{0\text{-}30}$" column is defined in analogy to table 6.

TABLE 10

| No. | Additive | Level of addition [wt %] | Extent of spread [mm] after | | $\Delta_{0\text{-}30}$ |
|---|---|---|---|---|---|
| | | | 0 min | 30 min | |
| E1 | — | — | 185 | 176 | −4.9% |
| E2 | ZK1 | 0.33 | 216 | 190 | −12.0% |
| E3 | ZK2 | 0.5 | 205 | 179 | −12.7% |
| E4 | ZK3 | 0.5 | 203 | 178 | −12.3% |

Relative to the reference sample E1 (no additive), the additives ZK, ZK2, and ZK3 (experiments No. E2-E4) exhibit a good plasticizing effect.

The working examples shown above serve merely as illustrative examples, which may be modified as desired within the bounds of the invention.

The invention claimed is:

1. A method of forming a cured composition, the method comprising: forming a mineral binder composition comprising caramelized sugar as a plasticizer and at least one further plasticizer, with the at least one further plasticizer comprising a polycarboxylate ether, and curing the mineral binder composition, wherein
the mineral binder composition comprises aggregates, with the aggregates having a methylene blue value according to the DIN EN 933-9 standard in the range of 0.1-100 g/kg with a particle size class 0-75 μm.

2. The method as claimed in claim 1, wherein the caramelized sugar extends the working time of the mineral binder composition.

3. The method as claimed in claim 1, wherein the caramelized sugar has a Hue Index color tone in the range of from 3.0-8.0.

4. The method as claimed in claim 1, wherein the caramelized sugar comprises caramel color of class INS No. 150a, 150b, 150c, and/or 150d.

5. The method as claimed in claim 1, wherein the caramelized sugar is used in an amount in the range of from 0.0001-10 wt. %, based in each case on the dry matter content of the caramelized sugar and based on the mineral binder content.

6. The method as claimed in claim 1, wherein the mineral binder composition comprises aggregates, where the aggregates contain 0.001-40 wt. % of fines having a particle size ≤125 μm, based on the total weight of all aggregates.

7. The method as claimed in claim 1, wherein a weight ratio of caramelized sugar to the further plasticizer is in a range of from 1:50-50:1.

8. A composition comprising caramelized sugar and at least one further plasticizer, with the at least one further plasticizer comprising a polycarboxylate ether.

9. A mineral binder composition comprising a composition as claimed in claim 8, and further comprising at least one mineral binder.

10. A cured binder composition obtainable by mixing of a mineral binder composition as claimed in claim 9 with water and subsequent curing.

11. A method for producing a composition as claimed in claim 8, comprising adding caramelized sugar to at least one further plasticizer, with the at least one further plasticizer comprising a polycarboxylate ether.

12. The mineral binder composition as claimed in claim 9, wherein the composition further comprises aggregates, with the aggregates having a methylene blue value according to the DIN EN 933-9 standard in the range of 0.1-100 g/kg with a particle size class 0-75 μm.

13. The method as claimed in claim 1, wherein the range is 15-100 g/kg.

14. The method as claimed in claim 1, wherein the range is 15-75 g/kg.

15. The method as claimed in claim 1, wherein the range is 25-60 g/kg.

16. The mineral binder composition as claimed in claim 9, wherein the range is 15-100 g/kg.

17. The mineral binder composition as claimed in claim 9, wherein the range is 15-75 g/kg.

18. The mineral binder composition as claimed in claim 9, wherein the range is 25-60 g/kg.

19. The method as claimed in claim 1, wherein the caramelized sugar comprises caramel color of class INS No. 150a and/or 150d.

20. The method as claimed in claim 1, wherein the caramelized sugar comprises caramel color of class INS No. 150a.

21. The composition as claimed in claim 8, wherein the caramelized sugar comprises caramel color of class INS No. 150a and/or 150d.

22. The composition as claimed in claim 8, wherein the caramelized sugar comprises caramel color of class INS No. 150a.

23. The mineral binder as claimed in claim 9, wherein the caramelized sugar comprises caramel color of class INS No. 150a and/or 150d.

24. The mineral binder as claimed in claim 9, wherein the caramelized sugar comprises caramel color of class INS No. 150a.

* * * * *